Patented Nov. 7, 1950

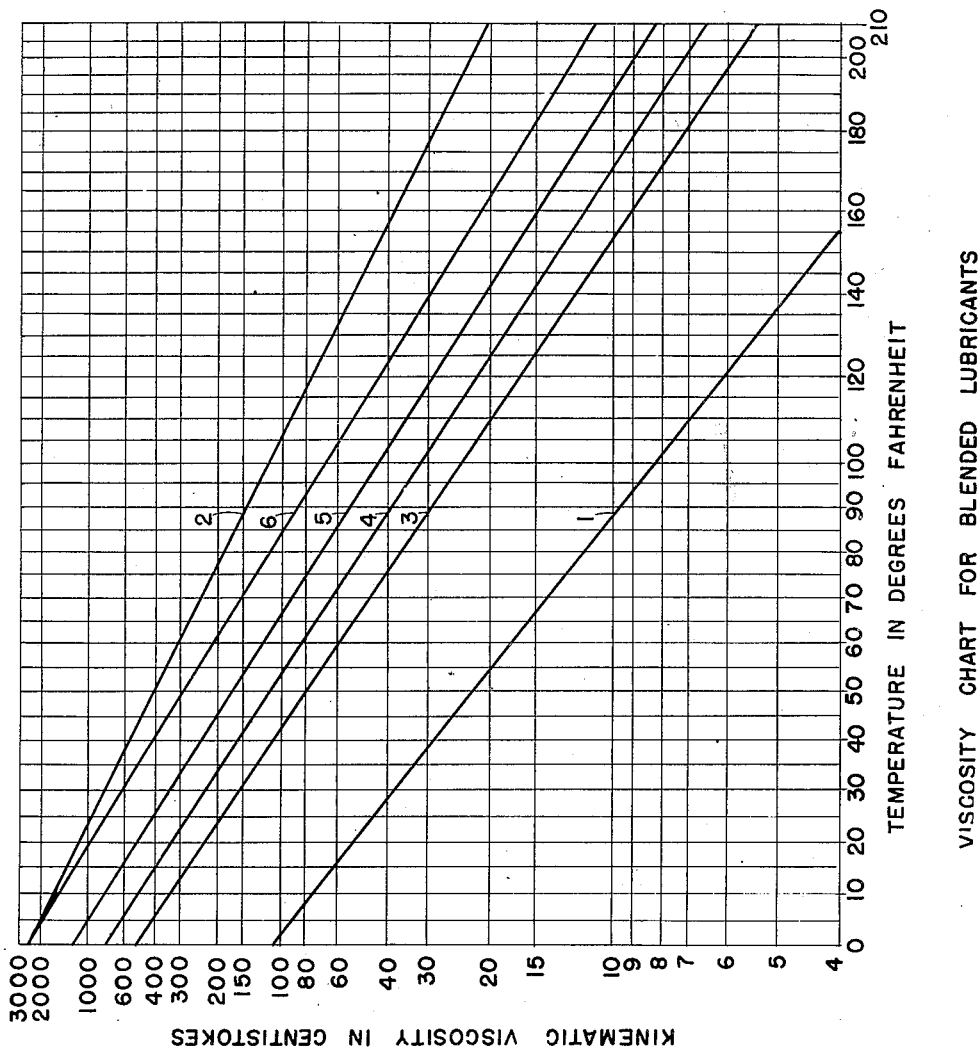

2,528,535

UNITED STATES PATENT OFFICE 2,528,535

FLUID LUBRICATING COMPOSITION

Robert L. Merker, United States Navy

Application August 13, 1946, Serial No. 690,194

7 Claims. (Cl. 252—49.6)

(Granted under the act of March 3, 1883, as amended April 30, 1928; 370 O. G. 757)

My invention relates to a lubricating composition and particularly to a fluid lubricating composition of a blended silicone-diester base.

The resistance of silicones to oxidation and ignition would seem to make their employment in the lubricating art a decided advantage over conventional hydrocarbon-base lubricants. However, their uses in this field have heretofore been necessarily limited by their resisting the incorporation of important additives. Such additives include oxidation, corrosion, and rust inhibitors, polymers, and thickeners such as metallic soaps used for the preparation of greases, which preparation is the subject of my copending application, Serial No. 690,195, filed of even date herewith, Patent No. 2,456,642.

The tendency of silicones to seize, rather than to lubricate certain metal to metal systems has been another severe limitation in their applicability to high speed and high temperature operation.

Thus, the striking properties of this family of compounds have not been utilized to the fullest extent.

It is a fundamental object of this invention to obviate some of the difficulties hereinbefore described and extend the use of silicones in the lubricating art.

It is another object of my invention to provide a fluid lubricating composition which contains in its base a major proportion of a silicone fluid but which provides solubility and compatibility for thickeners and other additives.

It is another object of my invention to provide a fluid lubricating composition which is characterized by its very high viscosity stability over a wide range of temperatures.

It is a further object of my invention to provide a fluid lubricating composition which is extremely resistant to oxidation.

It is a further object of my invention to provide a fluid lubricating composition suitable for use in delicate instruments, in high speed, high temperature operation, and in general purpose lubrication.

Other objects and advantages of my invention will in part be obvious and in part appear hereinafter.

My invention accordingly comprises the fluid silicone-diester base lubricants possessing the characteristics, properties, and the relation of components which will be exemplified in the detailed description hereinafter set forth and the scope of the invention will be indicated by the claims.

I have discovered that by combining silicones and liquid diesters of dicarboxylic or hydroxy acids, the resulting fluid blends possess substantially all of the desirable properties of the silicone fluids and the diester fluids while the undesirable qualities are substantially eliminated. Consequently, highly stable fluid lubricants are simply and economically produced and consistently reproduced. They display good oxidation resistance, good lubricating quality, and easy compatibility with various oxidation and rust inhibiting additives.

According to my invention, any liquid diesters, preferably those which have boiling points above 150° C. may be used in combination with the desired silicone to prepare the fluid. Among the aliphatic esters are straight or branched-chain alkyl diesters of aliphatic dicarboxylic acids having 4 or more carbon atoms in the chain, such as diethyl adipate, di-2-ethylhexyl adipate, diethyl pimelate, di - 2 - ethylhexyl suberate, diethyl azelate, ditetradecyl sebacate, di-2-ethylhexyl sebacate, and others. Mixed aliphatic-aromatic diesters are those such as methyl phthalyl ethyl glycolate, and aromatic diesters are those such as diethyl phthalate, dibutyl phthalate, di-2-ethylhexyl phthalate, and the like.

The organo-silicon polymers to be incorporated in the synthetic fluid of my invention may be any of those which are soluble in the desired diester liquid. Among these are alkyl, aryl, alkaryl, aralkyl straight and branched chain silicone polymers, such as dimethyl, diethyl, ethyl-methyl, diphenyl, ditolyl, phenyl-tolyl, phenyl-methyl, ethyl-phenyl silicones and others which conform to the general structure

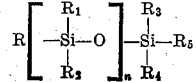

where R, $R_1$, $R_2$, $R_3$, $R_4$, and $R_5$ can be alike or different and may be any of the above mentioned radicals and $n$ is any whole number greater than 1. Cross-linked silicone polymers may be used equally well provided they are soluble in the chosen diester fluid. Silicone fluids available commercially are generally assigned a formula like that sketched, but it is understood in the art that a given fluid may contain chain compounds having the Si—O linkage and many cross-linked and divided elements.

The synthetic fluid lubricant of my invention comprises essentially a blend of between about 5 and 99 percent by weight of silicone polymer and between about 5 and 80 percent by weight of liquid diester.

Inhibiting ingredients such as oxidation, rust and corrosion inhibitors, polymer thickeners, extreme pressure additives and the like may be incorporated with this fluid, as conditions of operation dictate. Total inhibiting ingredients, in general, will be less than 3 per cent by weight.

In order to demonstrate that the combination of a silicone polymer and a diester fluid in the proportions of this invention not only preserves the desirable properties of the silicone, but by solubilizing the additives, produces a lubricant blend superior to any of its individual components, a series of lubricants were prepared and tested. Typical test data are shown in Table 1 and illustrated by curves in the appended figure.

The specific blended fluids whose properties are illustrated in the figure and in the examples are intended to be construed as illustrative of my invention and not by way of limitation. They were prepared from varying proportions of a phenyl-methyl silicone, such as polymethylphenylsiloxane (aromatic-aliphatic ratio —.51), and di-2-ethylhexyl adipate. When an oxidation inhibitor was used, 4-tertiary butyl-2-phenyl phenol was chosen. The polymer thickener when used was a methyl methacrylate resin.

The various components of any one mixture were heated together with stirring to about 350° F. to insure the attainment of complete solution.

Table I

| Reference to Figure | Kinematic Viscosities in Centistokes | | | ASTM Slope 0°–210° F. | Viscosity Index |
| --- | --- | --- | --- | --- | --- |
| | 0° F. | 100° F. | 210° F. | | |
| Curve 1 | 107 | 8.22 | 2.38 | 0.765 | 121 |
| Curve 2 | 2628 | 96.86 | 21.96 | 0.484 | 155 |
| Curve 3 | 550.1 | 22.57 | 5.425 | 0.665 | 170 |
| Curve 4 | 827.3 | 29.30 | 6.716 | 0.635 | 165 |
| Curve 5 | 1386 | 39.70 | 8.706 | 0.603 | 160 |
| Curve 6 | 2610 | 59.27 | 12.29 | 0.587 | 155 |

Referring to the figure, curves are plotted according to ASTM requirements of the kinematic viscosities in centistokes as a function of temperature. The slopes of these curves conform to ASTM specifications, and indicate the viscosity stability of the fluids. The proportions of ingredients are given in parts by weight unless otherwise specified.

Curve 1 represents the characteristics of the pure diester and is shown for comparison with the other curves;

Curve 2 represents the characteristics of a fluid lubricant consisting of 71.8 parts silicone, 20 parts diester, 8 parts a methyl methacrylate resin and 0.2 part oxidation inhibitor;

Curve 3 represents the characteristics of a fluid lubricant consisting of 69.8 parts silicone, 30 parts diester, and 0.2 part oxidation inhibitor;

Curve 4 represents the characteristics of a fluid lubricant consisting of 79.8 parts silicone, 20 parts diester, and 0.2 part oxidation inhibitor;

Curve 5 represents the characteristics of a fluid lubricant consisting of 89.8 parts silicone, 10 parts diester, and 0.2 part oxidation inhibitor;

Curve 6 represents the characteristics of the pure liquid silicone and is shown for comparison with the other curves.

It will be noted that curves 3, 4, and 5 possess substantially the same slope characteristics as curve 6, indicating that the desirable viscosity properties of the silicone are maintained in the mixtures of silicone-diester liquids. Curve 2 shows an improvement in the viscosity characteristics of the prepared lubricant over the pure silicone of curve 6. It is seen that the viscosity slopes of the compounded lubricants of my invention are real improvements over the viscosity of the pure diester shown in curve 1.

To illustrate the compatibility of the lubricant with the various additives, all of the above prepared fluid lubricants of silicone-diester composition were stored at minus 40° F. for 10 days. No separation of the additives from the base fluid was apparent. All of the samples remained clear.

It should be emphasized that my invention is not limited to the use of liquid silicones in the preparation of the fluid lubricants. Ester-soluble solid polymers of silicones, such as polymethylphenylsiloxane resins, have been used in preparing excellent fluid lubricants having properties similar to those illustrated in the above disclosure but, in general, having higher viscosities.

The following examples will serve to illustrate how the compositions, properties, and the proportions of ingredients of my lubricants may be varied according to my invention. Viscosities where indicated are expressed in centistokes measured at 25° C. and, in general, for any particular diester fluid depend on the viscosity of the silicone for combination therewith. All compositions were compounded in the manner described above.

*Example I*

A light instrument lubricant particularly suited to low temperature operation was prepared from the following ingredients.

| Component | Viscosity | Parts by Weight |
| --- | --- | --- |
| Dimethyl silicone | 5 | 83.3 |
| Di-2-ethylhexyl sebacate | | 15.0 |
| Diphenylamine | | 0.2 |
| Tricresyl phosphate | | 1.5 |

In this composition the diphenylamine served as an oxidation inhibitor; the tricresyl phosphate as an anti-wear and extreme pressure additive. Compositions similar to this but of greater viscosity were prepared by using a heavier dimethyl silicone.

*Example II*

Another low viscosity instrument lubricant had the following composition in which a minor proportion of catechol was employed as an oxidation inhibitor.

| Component | Viscosity | Parts by Weight |
| --- | --- | --- |
| Diethyl silicone | 10 | 94.8 |
| Methyl phthalyl ethyl glycolate | | 5.0 |
| Catechol | | 0.2 |

By varying the particular diethyl silicone used, heavier lubricants of this composition were prepared:

*Example III*

A more viscous instrument lubricant was formulated as follows:

| Component | Viscosity | Parts by Weight |
| --- | --- | --- |
| Methyl-phenyl (DC 550) silicone | 50 | 35.0 |
| Diethyl phthalate | | 63.0 |
| Sorbitan monooleate | | 2.0 |

Sorbitan monooleate was used as a rust inhibitor in this lubricant. Lighter lubricating fluids of this composition were prepared by using diphenyl silicones having lower viscosities.

*Example IV*

A lubricant particularly suited to high temperature, high pressure lubrication had the following composition.

| Component | Viscosity | Parts by Weight |
|---|---|---|
| Methyl-phenyl (DC 710) silicone | 207 | 55.0 |
| Ditetradecyl sebacate | | 42.8 |
| Para-hydroxy diphenyl | | 0.2 |
| Sorbitan monooleate | | 2.0 |

For this lubricating composition sorbitan monooleate was chosen as a rust inhibitor; para-hydroxy diphenyl as an oxidation inhibitor.

*Example V*

Typical of the lubricants of my invention in which solid polymeric silicones are employed in the following composition.

| Component | Parts by Weight |
|---|---|
| Solid polymeric i. e. polymethylphenylsiloxane resin | 7.8 |
| Di-2-ethylhexyl azelate | 92.0 |
| Diphenylamine | 0.2 |

This composition is of particular value in general lubrication applications wherein the lubricant is not subjected to excessive shearing stresses. It is a relatively light lubricant and contains a minor proportion of diphenylamine as an oxidation inhibitor.

The fluid lubricants of my invention find many uses other than in general lubrication. Because of their extremely high viscosity stability and oxidation resistance, they are especially valuable for use in compasses, gyroscopes and delicate machinery, or for other similar uses wherein extremes of temperature and high operating speeds are encountered.

Accordingly, it is to be understood that this invention is not restricted to present disclosure otherwise than defined by the appended claims.

The invention described herein may be manufactured and used by or for the Government of the United States of America for governmental purposes without the payment of any royalties thereon or therefor.

What is claimed is:

1. A lubricating composition consisting essentially of a blend of an organo-siloxane having as its chain structure:

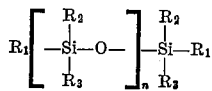

where $n$ is a whole number greater than 1, and where $R_1$, $R_2$ and $R_3$ represent a combination of not more than two of the radicals selected from the group consisting of methyl, ethyl, phenyl and tolyl radicals, and a diester of a dicarboxylic acid, said acid being composed of carbon, oxygen and hydrogen and having from about 4 to about 10 carbon atoms in its molecular structure.

2. A fluid lubricating composition consisting essentially of a blend of from about 5 to about 99% by weight of a dimethyl siloxane, from about 80 to about 5% by weight of a diester of a dicarboxylic acid, said acid being composed of carbon, oxygen and hydrogen and having from about 4 to about 10 carbon atoms in its molecular structure.

3. A fluid lubricating composition consisting essentially of a blend of from about 5 to about 99% by weight of a methyl phenyl siloxane, from about 80 to about 5% by weight of a diester of a dicarboxylic acid, said acid being composed of carbon, oxygen and hydrogen and having from about 4 to about 10 carbon atoms in its molecular structure.

4. A fluid lubricating composition consisting essentially of a blend of about 85 parts by weight of dimethyl siloxane and about 15 parts by weight of di-2-ethylhexyl adipate.

5. A fluid lubricating composition consisting essentially of a blend of about 25% by weight of an ethylphenyl siloxane and about 72% by weight of di-2-ethyl hexyl sebacate.

6. A fluid lubricating composition consisting essentially of a blend of about 40% by weight of a ditolyl siloxane and about 58% by weight of dibutyl phthalate.

7. A fluid lubricating composition consisting essentially of a blend of from about 5 to about 99% by weight of a diethyl siloxane, from about 80 to about 5% by weight of a diester of a dicarboxylic acid, said acid being composed of carbon, oxygen and hydrogen and having from about 4 to about 10 carbon atoms in its molecular structure.

ROBERT L. MERKER.

REFERENCES CITED

The following references are of record in the file of this patent:

UNITED STATES PATENTS

| Number | Name | Date |
|---|---|---|
| 2,343,430 | Wells | Mar. 7, 1944 |
| 2,398,187 | McGregor et al. | Apr. 9, 1946 |
| 2,406,671 | Diamond | Aug. 27, 1946 |
| 2,410,346 | Hyde | Oct. 29, 1946 |